United States Patent [19]

Lind et al.

[11] Patent Number: 5,573,674

[45] Date of Patent: Nov. 12, 1996

[54] ACTIVATED SILICA SOL

[75] Inventors: Christopher B. Lind, Syracuse, N.Y.; Michael A. Ware, Mississauga, Canada

[73] Assignee: General Chemical Corporation, Del.

[21] Appl. No.: 549,558

[22] Filed: Oct. 27, 1995

[51] Int. Cl.[6] ............................. C02F 1/52; B01J 13/00
[52] U.S. Cl. ............... 210/702; 210/723; 210/728; 210/928; 252/175; 252/313.2; 106/287.34; 162/181.6; 423/328.1; 423/338
[58] Field of Search ............................. 210/729, 705, 210/719, 696; 252/313.2, 175; 106/287.34; 162/181.6; 423/328.1, 338

[56] References Cited

U.S. PATENT DOCUMENTS

| 2,928,754 | 3/1960 | Schappel | 252/313.2 |
|---|---|---|---|
| 2,931,779 | 4/1960 | White | 252/313.2 |
| 2,974,108 | 3/1961 | Alexander | 252/313.2 |
| 2,980,558 | 4/1961 | Dempey et al. | 252/313.2 |
| 3,252,917 | 5/1966 | Mindick et al. | 252/313.2 |
| 3,817,861 | 6/1974 | Slusarczuk et al. | 210/728 |
| 4,095,985 | 6/1978 | Brown | 106/15 |
| 5,023,012 | 6/1991 | Buchan et al. | 210/725 |
| 5,149,400 | 9/1992 | Haase et al. | 162/181.6 |

FOREIGN PATENT DOCUMENTS

| 0329509 | 8/1989 | France | 252/313.2 |

OTHER PUBLICATIONS

Noreus, "The Use of Activated Silica in the Coagulation of Highly Colored Water," TAPPI, Paper Trade Journal, vol. 120, No. 11 Mar. 15, 1945 pp. 101–103.

*Primary Examiner*—Neil McCarthy
*Assistant Examiner*—Betsey Morrison
*Attorney, Agent, or Firm*—Arthur J. Plantamura

[57] ABSTRACT

A stable activated silica sol is made by reacting sodium aluminum sulfate and a solution of silica. This solution removes suspended particles from aqueous streams rapidly and effectively. The silica sol is stable for many days and thus can be prepared off-site and transported to the point of use. Further, the activated silica or colloidal silica sol solution of the invention can be continuously added to water and waste water streams, or paper making pulps, stocks and furnishes, without danger of solidifying in the transport systems.

12 Claims, No Drawings

ACTIVATED SILICA SOL

This invention relates to improved flocculating agents to remove suspended solids from raw, process and waste waters. More particularly, this invention relates to improved activated silica sol flocculent that are stable for long periods of time.

BACKGROUND OF THE DISCLOSURE

Activated silica sols have been used for many years to coagulate suspended particles in water. The silica sols envelop the particles and settle out of solution, thereby clarifying the water. Activated silica sols can be used alone, or, as is more usual, together with other conventional coagulants, such as alum ($Al_2(SO_3)_3 \cdot 14H_2O$), lime or iron salts, that remove both suspended particles and color bodies from water. Activated silica sols are also used in paper making for retention, drainage and strength improvements. This industry employs the term "colloidal silica" for activated silica sols.

Sodium silicate is made by reacting $SiO_2$ with $Na_2O$ so that the resultant sodium silicate contains a $SiO_2:Na_2O$ weight ratio between 3.22–3.25:1. The silica sols are activated by adding chlorine, alum or other material such as sodium bicarbonate, sulfuric acid or ammonium sulfate, to the diluted silica sol. More recently, sodium aluminate has also been reacted with sodium silicate for producing an activated silica sol.

The combined suspended particle/silica sol is a fast acting flocculents. Desirable flocculent must settle rapidly in water by forming large, heavy particles. The supernatant clarified water reduces the costs of filtering the water by increasing flow through rates and reducing both the frequency and length of backflushing. Also, less of conventional materials used to remove suspended particles and color bodies from water, such as alum and lime, are required. The activated silica sol is used to precipitate solids that are reclaimable as well, such as fibers, fillers and the like from paper manufacturing waste waters, thus reducing the overall costs of paper manufacture.

However, activated silica sols must be made batchwise, on site, just prior to use because they gel or solidify in a short period of time, e.g., about two hours or less, when they become unusable. This requires blending systems, dosage systems and handling equipment also to be located on site so that the activated silica sol can be used before it solidifies or gels. Great care must be taken that the activated silica sol does not solidify in pipes, joints and the like.

Thus it would be highly desirable to produce an activated silica sol that is stable, and can be premixed and stored for long periods of time without gelling or solidifying. Such a stable activated silica sol could also be used "on line", added continuously during generation of waste waters to remove suspended materials and color bodies continuously from wash or waste water streams during manufacturing processes.

SUMMARY OF THE INVENTION

We have found that stable activated silica sols can be made by substituting sodium aluminum sulfate (hereinafter SAS) for sodium aluminate or other activator. The resultant product remains stable and flowable for long periods of time, i.e., at least 30 days. Thus the activated silica sols of the invention will not damage handling equipment. The stable activated silica sols of the invention are at least as effective as existing activated silica sols as flocculent, and in some cases are more effective. However, they have the advantage over conventional activated silica sols in that they can be premixed and stored, and safely transported to the site of use. Further, they can be produced continuously which may be more convenient than producing the sols in a batch-type process.

DETAILED DESCRIPTION OF THE INVENTION

The SAS of the invention is made by heating liquid solutions of sodium sulfate and aluminum sulfate to obtain a combined salt.

Aluminum sulfate is made by reacting bauxite or aluminum trihydrate and sulfuric acid according to the equation:

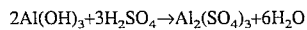

$$2Al(OH)_3 + 3H_2SO_4 \rightarrow Al_2(SO_4)_3 + 6H_2O$$

Sulfuric acid (66 Baumé) is stirred into an aqueous slurry of bauxite or aluminum trihydrate, while maintaining a maximum temperature at about 230° F. After digesting for about 4–8 hours while checking the temperature, free acidity and Baumé, water is added to lower Baumé to 29°–30°. The recovered aluminum sulfate is reacted with sodium sulfate in stoichiometric amounts based on the amounts of both aluminum sulfate and aluminum oxide present, to form a combined $Na_2SO_4$—$Al_2(SO_4)_3$ salt. The liquor thus produced is clarified via filtration or other process and is termed "clear liquor" at this point.

Activated silica sol is made from the above combined SAS salt by first stirring sodium silicate in water, adding the combined SAS salt solution and stirring for about 12–15 minutes. This may be done by the manufacturer and provided for use on the customer's site.

The resultant silica sol provides a stable flocculent that does not damage feed equipment, is chlorine free, can be used "on line", can be premixed with other conventional flocculents materials such as alum, is low in cost and non-hazardous.

The invention will be further described in the following Examples, but the invention is not meant to be limited to the details described therein. In the examples, percentages are by weight.

EXAMPLE 1

The first step in the preparation of an activated silica solution is the dilution of the concentrated sodium silicate. Two 2.0 mL of sodium silicate is added to 50 mL of water with stirring. When thoroughly dissolved, the solution is diluted to 100 mL. This is the stock solution that is activated by the SAS or traditional activators as follows:

A Control solution was made using commercial sodium aluminate (23% $Al_2O_3$) which is commercially available. To the above sodium silicate stock solution, 0.9 mL of sodium aluminate was added with mixing for at least one minute. This sol was aged for 15 minutes prior to use. It was further diluted by taking 64 mL and diluting it to 500 mL with water. The final $Al_2O_3$ concentration of the Control solution was 0.35%.

The aluminum sulfate test sol was prepared as above substituting 3.16 mL of standard aluminum sulfate containing 8.3% $Al_2O_3$ as activator. The final $Al_2O_3$ concentration of the aluminum sulfate solution was also 0.35%.

The SAS sols were prepared as above except substituting SAS liquor for the aluminum sulfate or sodium aluminate in several concentration ranges of $Al_2O_3$. One sol contained 0.5 ml SAS liquor, one 1.0 mL SAS liquor and one 2.0 mL SAS liquor. The final $Al_2O_3$ concentrations were 0.11%, 0.22% and 0.44% respectively. Each mL of the final 500 mL of all of the activated test sol also contained 1 mg of silica.

These test solutions were tested for stability, i.e., crystallization, gelling, precipitation and the like, and for function as a flocculents in coagulation tests.

The Control solution solidified within two hours. The 500 ml dilution test solution of the Control gelled within eight hours. The alum activated solution concentrate gelled within two days; and the 500 mL test solution precipitated within two days. These solutions are unusable when they have precipitated, gelled or solidified.

The SAS prepared solutions of the invention remained in solution and were functional for several days. The prepared sols of the invention can be stored in refrigerated containers at −4° C., at 4° C. and at room temperature at 20° C. for over 90 days without loss of stability.

The coagulation tests described in Table I below were conducted using a very highly turbid water. The coagulant used was a polyaluminum hydroxychloride at 22.5% $Al_2O_3$ and 75% basicity, which is commercially available from General Chemical Corporation as Hyper+Ion®1090. The same type of coagulant was used throughout the tests in Tables I and II.

The coagulant test procedure, known as jar tests, is carried out as follows: the turbid water is stirred rapidly (>100 rpm) for 0.5 minute, and the coagulant is added. The mixing speed is lowered to 30 rpm during addition of the activated silica test solution, and allowed to flocculate for at least ten minutes. Mixing is then stopped and the mixture is allowed to settle for a minimum of eight minutes. The clarified supernatant liquid is withdrawn for analysis of turbidity and pH. All of the activated silica test solutions were dosed to provide 1.0 ppm of silica (as $SiO_2$) as a flocculent. 30 ppm of the coagulant was used. The results are set forth below in Table I.

TABLE I

| Sample | Turbidity, NTU |
|---|---|
| No treatment | >2000 |
| No silica added | 4.8 |
| Control (aluminate activated) | 2.6 |
| SAS (0.11% $Al_2O_3$) | 2.5 |
| SAS (0.22% $Al_2O_3$) | 2.6 |
| SAS (0.44% $Al_2O_3$) | 2.6 |
| Alum activated | 2.2 |

The above procedure was repeated except using 4.0 ppm of silica and 20 ppm of coagulant. The results are given below in Table II.

TABLE II

| Sample | Turbidity, NTU |
|---|---|
| No Treatment | >2000 |
| Control (aluminate activated) | 4.4 |
| SAS (0.11% $Al_2O_3$) | 5.5 |
| SAS (0.22% $Al_2O_3$) | 3.6 |
| SAS (0.44% $Al_2O_3$) | 3.6 |

Thus above a minimum aluminum oxide level, the activated silica sols of the present invention gave improved results over the sodium aluminate Control and was far more stable.

EXAMPLE 2

A raw water having a pH of 7.15, color of 25 color units and turbidity of 48 NTU was stirred at 100 rpm for 0.5 min with Hyper+Ion 1090. Sodium silicate solutions of the invention and control tests were added and stirred at 100 rpm for an additional 0.5 minute. The mixing speed was reduced to 50 rpm for four minutes, then reduced to 10 rpm for ten minutes. In this test the aluminate used was Han-floc 45, a commercial product of Handy Chemicals. The mixing procedure can be varied as necessary; in this case the actual water plant process was simulated.

The flocculation speed was measured, as well as turbidity, both of the supernatant liquid and the filtered liquid. A series of test runs were made varying the amount of flocculent. The results are summarized below in Table III.

TABLE III

| Sample Activator & % $Al_2O_3$ | $SiO_2$ | Hyper + Ion 1090 mg/l | Floc size | Turbidity settled | Turbidity filtered | Floc speed, min |
|---|---|---|---|---|---|---|
| Control | 0 | 30 | small | 4.8 | 0.15 | 6.0 |
| Han-floc* | 1 | 30 | small+ | 4.0 | 0.11 | 5.0 |
| SAS (0.11%) | 1 | 30 | small+ | 2.6 | 0.09 | 4.0 |
| SAS (0.22%) | 1 | 30 | small+ | 2.5 | 0.08 | 3.0 |
| SAS (0.44%) | 1 | 30 | medium | 2.6 | 0.09 | 1.0 |
| Alum*/$SiO_2$ | 1 | 30 | small+ | 2.2 | 0.10 | 2.0 |
| Control | 0 | 20 | pinpoint | 25.0 | 0.20 | 6.0 |
| Han-floc* | 2 | 20 | small | 12.0 | 0.12 | 5.0 |
| SAS (0.11%) | 2 | 20 | small | 16.0 | 0.12 | 4.0 |
| SAS (0.22%) | 2 | 20 | small | 7.5 | 0.10 | 2.0 |
| SAS (0.44%) | 2 | 20 | small | 7.0 | 0.10 | 1.0 |
| Alum*/$SiO_2$ | 2 | 20 | small | 8.7 | 0.10 | 3.0 |
| Control | 0 | 20 | pinpoint | 24.0 | 0.22 | 6.0 |
| Han-floc* | 4 | 20 | small+ | 4.4 | 0.22 | 6.0 |
| SAS (0.11%) | 4 | 20 | small+ | 8.6 | 0.12 | 5.0 |
| SAS (0.22%) | 4 | 20 | small+ | 3.6 | 0.09 | 4.0 |
| SAS (0.44%) | 4 | 20 | medium | 3.2 | 0.09 | 1.0 |
| Alum*/$SiO_2$ | 4 | 20 | small+ | 4.3 | 0.10 | 3.0 |

*Contain 0.35% $Al_2O_3$

The above data shows that when sufficient SAS is present, the flocculation time and the removal of suspended particles in water is at least as good as sodium aluminate. However, the present SAS activated silica sols demonstrate improved stability over sodium aluminate activated silica sols.

Although the present invention has been described in terms of specific embodiments, various changes to the amounts of materials, processing conditions and additives can be made without departing from the spirit of the invention, and are meant to be included herein. The invention is only meant to be limited by the attached claims.

We claim:

1. A stable, activated silica sol solution comprising the reaction product of sodium aluminum sulfate and a member selected from the group consisting of colloidal silica and sodium silicate solutions.

2. A silica sol solution according to claim 1 wherein the aluminum content of the solution as aluminum oxide is at least about 0.11 percent by weight.

3. A silica sol solution according to claim 1 wherein said solution additionally includes a coagulant.

4. A process for clarifying water containing suspended particles comprising stirring with said water the activated silica sol solution of claim 1.

5. A process according to claim 4 wherein said water includes colloidal organic and inorganic materials.

6. A process according to claim 4 wherein a polymer is added to said water.

7. A process according to claim 4 wherein a polyelectrolyte is added to said water.

8. A process according to claim 4 wherein said water is treated to remove dissolved organic and inorganic dissolved material.

9. A process according to claim 4 wherein a coagulant is added to said water.

10. A process according to claim 4 wherein alum is added to said water.

11. A process for improving the making of paper comprising adding the activated silica sol solution of claim 1 to a suspension of paper and papermaking materials in water.

12. A continuous process for clarifying an aqueous stream containing suspended particles therein comprising continuously adding an activated silica sol solution of claim 1 to said aqueous stream.

* * * * *